United States Patent [19]
Doyle

[11] 3,832,444
[45] Aug. 27, 1974

[54] RECOVERY OF $SO_2$ AND $SO_3$ FROM FLUE GASES

[75] Inventor: William L. Doyle, Hermosa Beach, Calif.

[73] Assignee: TRW Inc., Redondo Beach, Calif.

[22] Filed: May 18, 1972

[21] Appl. No.: 254,812

Related U.S. Application Data
[63] Continuation of Ser. No. 62,313, Aug. 10, 1972, abandoned.

[52] U.S. Cl. .............................. 423/242, 423/512
[51] Int. Cl. ..................... C01b 17/00, C01b 17/45
[58] Field of Search ........................... 423/242–244, 423/512

[56] References Cited
UNITED STATES PATENTS

| | | | |
|---|---|---|---|
| 2,080,528 | 5/1937 | Bowman et al. | 423/512 |
| 3,305,307 | 2/1967 | Spormawn et al. | 423/512 |
| 3,524,720 | 8/1970 | Baver | 423/244 |

*Primary Examiner*—Oscar R. Vertiz
*Assistant Examiner*—Gregory A. Heller
*Attorney, Agent, or Firm*—Daniel T. Anderson; Alan D. Akers; Willie Krawitz

[57] ABSTRACT

$SO_2$ and $SO_3$ are recovered from flue gas by absorption in a saline solution of sodium carbonate or sodium hydroxide maintained at a high pH. $Na_2SO_3$ is precipitated and may be easily removed, while the $SO_2$ concentration is reduced to about 1 percent of the original content in the flue gas.

3 Claims, 1 Drawing Figure

PATENTED AUG 27 1974 3,832,444
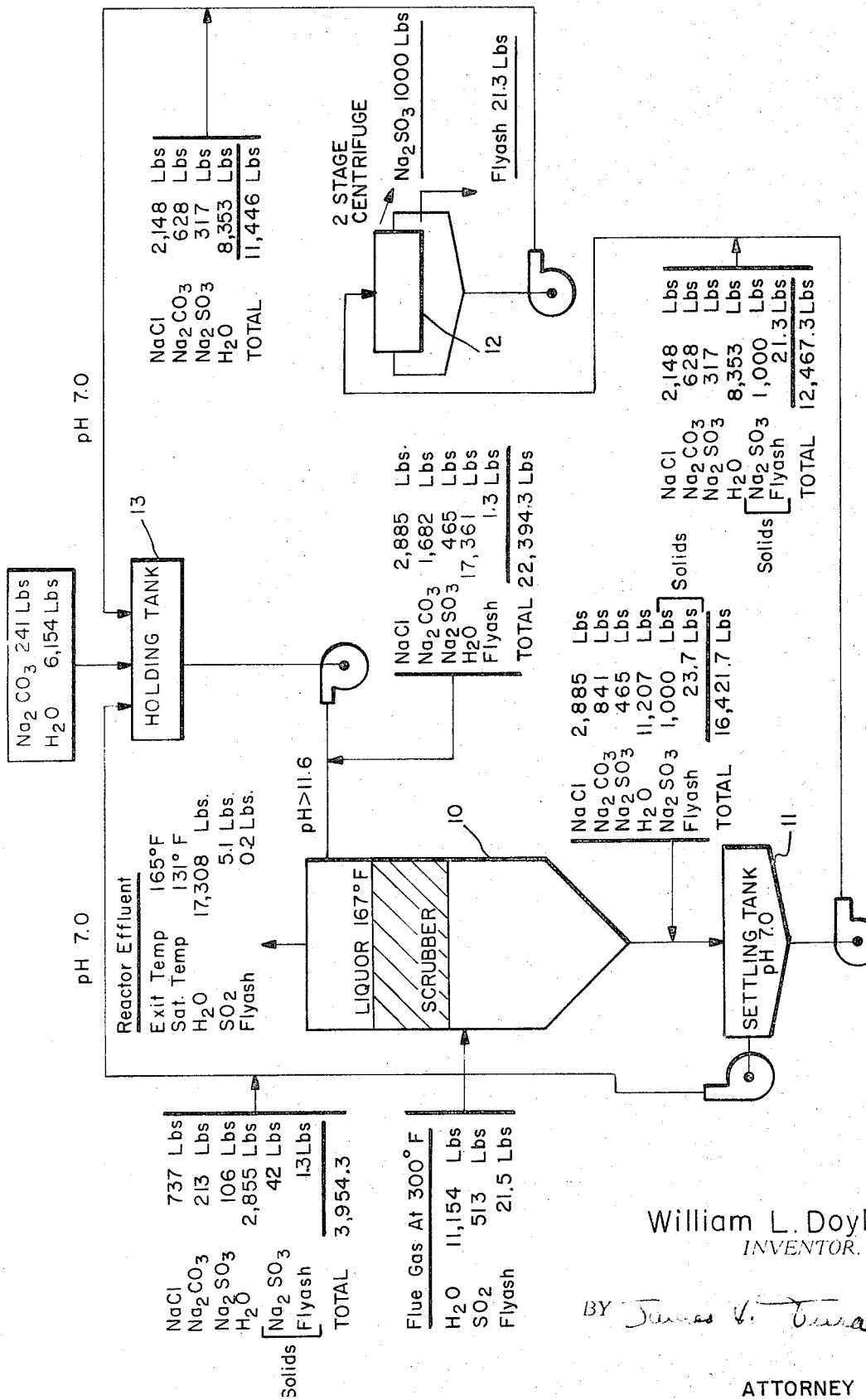
William L. Doyle
INVENTOR.
BY James V. Tiira
ATTORNEY

RECOVERY OF $SO_2$ AND $SO_3$ FROM FLUE GASES

This is a continuation, of application Ser. No. 62,313, filed Aug. 10, 1972 and now abandoned.

BACKGROUND OF THE INVENTION

This invention relates to the removal of $SO_2$ and $SO_3$ from a gas stream and more specifically to the removal of these gases from a flue gas stream by reaction with an aqueous solution of sodium carbonate.

Many chemical reactions have been proposed for the absorption of sulfur dioxide containing gases and these have included reactions using soda lime, sodium carbonate, calcium carbonate, ammonium compounds, etc. While these processes are effective in absorbing sulfur dioxide, a basic problem of the process is the disposal of the effluent produced by the reaction. Furtherore, if sodium sulfite is produced as a byproduct, its removal, such as by absorption or evaporation techniques, is expensive.

Generally, $SO_2$ and $SO_3$ absorption plants are expensive, and require a large capital and operating expenditure.

It is, therefore, an object of this invention to provide a process for an economic and efficient removal of $SO_2$, $SO_3$, and other sulfur oxide gases from a gas stream.

Another object is to provide a process for producing solid sodium sulfite and sodium sulfate.

THE INVENTION

According to the invention, gaseous sulfur oxides, such as $SO_2$ and $SO_3$, are recovered by reacting these gases with an aqueous solution containing NaCl together with sodium carbonate or sodium hydroxide. While the reaction of $SO_2$ and $SO_3$ with sodium carbonate to form the soluble sodium sulfite and sulfate is conventional, it has been discovered, surprisingly, that the presence of NaCl causes the bulk of the sodium sulfite to be precipitated and thereby facilitates its removal. For a $Na_2SO_3$ yield of about 65–70 percent, the precipitation reaction of the sodium sulfite should take place at a pH in excess of about 7 and preferably at about pH 7–8. Sufficient NaCl should be employed to ensure that the precipitation reaction is driven to completion. A suitable $NaCl:Na_2SO_3$ ratio in the sodium carbonate solution is about 2:1. This ratio may vary considerably to about 6.2:1 and still precipitate the sodium sulfite in reasonably good yields. The reaction may be conducted at atmospheric pressure, and a suitable temperature range is about 100° to 200° F in the scrubber; temperatures in the higher portion of this range are preferred.

The reaction of $SO_3$ with sodium carbonate to form sodium sulfate and the precipitation of the sodium sulfate is similar to the precipitation of sodium sulfite.

EXAMPLE

A source of sulfur dioxide in a flue gas was produced by burning a Venezuelan No. 6 crude oil having the following characteristics: API gravity 14 to 16; sulfur content 2.5 percent by weight; GHP $6.25 \times 10^6$ BTU/BBL; vanadium content 250 to 300 PPM. Burning of this crude oil produced a flue gas containing $SO_2$ and fly ash which was then passed into the bottom of a scrubbing tower 10 at 300° F. The flue gas was washed countercurrent with a downwardly descending solution of NaCl, $Na_2CO_3$ and $H_2O$, the solution being at a pH exceding 11.6. The flue gas was cooled in the scrubbing tower from 300° to 167° F, and was considerably reduced both in $SO_2$ content and fly ash content, before emission from the scrubber as effluent. The absorbing liquor containing NaCl, $Na_2CO_3$, fly ash, $H_2O$, and $Na_2SO_3$ was passed into a settling tank 11 where the precipitate remained for about 5 minutes at pH 7 while it thickened. From the settling tank 11, a slurry of solid sodium sulfite and fly ash, in the solution of sodium chloride, sodium carbonate and sodium sulfate was forwarded to a centrifuge 12; here the solid sodium sulfite and fly ash were removed. The filtrate containing sodium chloride, sodium carbonate and the remaining dissolved sodium sulfite was recycled to a holding tank 13 where it was combined with a makeup solution of sodium carbonate and water. Recycled solution from the settling tank 11 was also fed to the holding tank 13. The combined solution in the holding tank was then continuously recycled into the scrubbing tower 10 for further removal of $SO_2$ from the flue gas.

The material balances at various points in the system are indicated in the diagram and show the sulfur dioxide and fly ash content in the scrubbing tower effluent was decreased significantly compared to their respective concentrations in the flue gas stream. While this is to be expected when reacting a flue gas containing sulfur dioxide with a sodium carbonate solution, the unexpected feature of this process is the formation of a sodium sulfite precipitate with good yield and in anhydrous form.

It will be appreciated that many variations are possible within the scope of this invention. For example, a mixture of $Na_2CO_3$ with NaOH, or NaOH alone may be employed to react with the $SO_2$ or $SO_3$. Also, the ratio of $NaCl:Na_2SO_3$ may vary widely and still precipitate the $Na_2SO_3$.

Accordingly, it will be seen that the removal of $SO_2$, $SO_3$, and other sulfur oxides from a gas stream is accomplished by reacting with $Na_2CO_3$; the sodium salt which is formed, such as $Na_2SO_3$ is then removed from the system by precipitation with NaCl. The invention thus provides a simple reaction mechanism for effective and continuous removal of $SO_2$ and $SO_3$ from a gas stream without problems involving effluent, high capital cost and large operating expenses. Furthermore, the solid $Na_2SO_3$ represents a commodity item whose sale can offset some of the operating expenses.

I claim:

1. In a process for recovering $SO_2$ contained in a flue gas stream comprising:
   scrubbing the flue gas with an aqueous solution of $Na_2CO_3$ or NaOH to absorb the said $SO_2$ at a pH in excess of about 7;
   the improvement comprising: precipitating anhydrous sodium sulfite from the absorbing solution with NaCl, while absorbing the $SO_2$, the ratio of $NaCl:Na_2SO_3$ being about 2:1 to about 6.2:1, the precipitation reaction being carried out at a pH 7–8;
   separating the precipitate from the solution;
   recycling the solution to the scrubbing step; and
   emitting the scrubbed flue gas as effluent; the scrubbing and effluent temperatures ranging from about 100° F to about 200° F.

2. The process of claim 1 in which the scrubbing and effluent temperatures range from about 167° F to about 200° F.

3. The process of claim 1 in which the $Na_2SO_3$ precipitate is collected in a settling tank.

* * * * *